Feb. 1, 1955  G. E. BOCK  2,700,937
APPARATUS FOR TRANSPORTING AIRCRAFT
Filed Dec. 13, 1950  9 Sheets-Sheet 1

INVENTORS
George E. Bock
BY
ATTORNEY

Feb. 1, 1955

G. E. BOCK 2,700,937

APPARATUS FOR TRANSPORTING AIRCRAFT

Filed Dec. 13, 1950

*INVENTORS*
George E. Bock

BY

ATTORNEY

Feb. 1, 1955

G. E. BOCK 2,700,937

APPARATUS FOR TRANSPORTING AIRCRAFT

Filed Dec. 13, 1950

*INVENTORS*
George E. Bock

BY

ATTORNEY

Feb. 1, 1955   G. E. BOCK   2,700,937
APPARATUS FOR TRANSPORTING AIRCRAFT
Filed Dec. 13, 1950   9 Sheets-Sheet 4

INVENTORS
George E. Bock
BY 
ATTORNEY

Feb. 1, 1955  G. E. BOCK  2,700,937
APPARATUS FOR TRANSPORTING AIRCRAFT
Filed Dec. 13, 1950  9 Sheets-Sheet 5

INVENTORS
George E. Bock
BY
ATTORNEY

Feb. 1, 1955

G. E. BOCK

2,700,937

APPARATUS FOR TRANSPORTING AIRCRAFT

Filed Dec. 13, 1950

INVENTORS
George E. Bock

BY

ATTORNEY

Feb. 1, 1955    G. E. BOCK    2,700,937
APPARATUS FOR TRANSPORTING AIRCRAFT
Filed Dec. 13, 1950    9 Sheets-Sheet 9

*INVENTORS*
George E. Bock
BY
ATTORNEY

United States Patent Office 2,700,937
Patented Feb. 1, 1955

2,700,937

APPARATUS FOR TRANSPORTING AIRCRAFT

George E. Bock, Chicago, Ill., assignor to Whiting Corporation, a corporation of Illinois Application December 13, 1950, Serial No. 200,670

26 Claims. (Cl. 104—140)

My invention is directed to apparatus particularly adapted for moving aircraft on the ground transversely to the normal direction of aircraft movement, as for example from a runway or taxiway to a parking zone or loading dock. Reference is made to a certain patent application by Herbert W. Anderson, Serial No. 157,565, filed April 17, 1950, for Apparatus for Loading and Unloading Airplanes at Airports, in connection with which the subject invention is particularly useful.

The principal objects of this invention includes the provision of rail transfer car means particularly adapted for receiving and supporting aircraft landing gear, preferably incorporating means for preventing accidental displacement of aircraft positioned on the car, and means for moving the car along the rails, all disposed and arranged in such manner as to reduce the safety hazards incidental to such operation to a minimum, to insure continuous and efficient operation of the apparatus under all circumstances, to allow performance of necessary maintenance work on the apparatus without creating an aircraft traffic hazard and to reduce the cost of installation and maintenance to a minimum without loss of flexibility and ability.

Other important objects, relating to the various novel combinations and component parts are described in the following description and illustrated in the appended drawings, in which.

In brief, the subject apparatus includes spaced parallel rails extending from a parking zone across the airport apron into the taxiway, at least the portion of the rails extending into the taxiway being laid in narrow trenches, the depth of which is sufficient to dispose the rail surfaces well below the surface of the taxiway.

A cover rests on the portion of the taxiway between the rails and extends laterally partially over each of the trenches, thus defining narrow elongated slits over the trenches. The surface of the cover is preferably parallel to and slightly below the taxiway surface so the aircraft passing along the taxiway can cross the trenches and cover without difficulty or danger.

The cars which travel along the rails are generally U-shaped in cross section and include a plurality of rail wheels adapted for movement along the rails. The wheels are journaled on upright members which project upwardly through the slots, these members being secured along their upper edges to the substantially flat, relatively thin body of the car, the lower surface of which is disposed only slightly above the level of the upper surface of the cover. As a result, the upper surface of the car body, which is adapted to receive and support aircraft landing wheels, is at a level only slightly above the level of the taxiway, with the result that aircraft may cross the car with little difficulty. To assist in this movement, the car is preferably provided with ramps pivoted at their edges to the edges of the car. In the preferred form, means are provided for raising these ramps from a lowered position and for holding them in raised position thus preventing unintentional displacement of the wheels from the car.

Ordinarily, conventional aircraft will require the use of a main transfer car adapted to receive the main landing wheels and a nose wheel car disposed forwardly from the main car. Power means are provided for moving the main wheel car, and if desired, the nose wheel car along the rails. Cables may be employed for this purpose; but if desired, motors may be mounted on the cars and driven by a current supplied from conductors supported in conventional manner in the trenches.

Certain aircraft are constructed in such manner that the nose wheel may be rotated through 90° without dangerously stressing the component parts. In moving such aircraft transversely, only a main wheel car is required for receiving and supporting the main landing wheels, usually disposed beneath the aircraft wing.

The component parts are arranged in such manner that the trenches constitute the only necessary taxiway openings with the result the maintenance operations can be performed without creating a taxiway traffic hazard. Also, because of the disposition of the cover and body of the car with respect to the taxiway surface, aircraft can safely traverse the taxiway regardless of whether the cars are disposed on the taxiway or in the parking or loading zone. Since aircraft being moved to a parking or loading zone are not required to maneuver under their own power, the substantial savings in space can be effected. Furthermore, since the position of the aircraft when parked or loading is also fixed, permanent installation for handling freight, luggage, passengers, fuel, and the like may be economically provided.

Figures 1, 2:
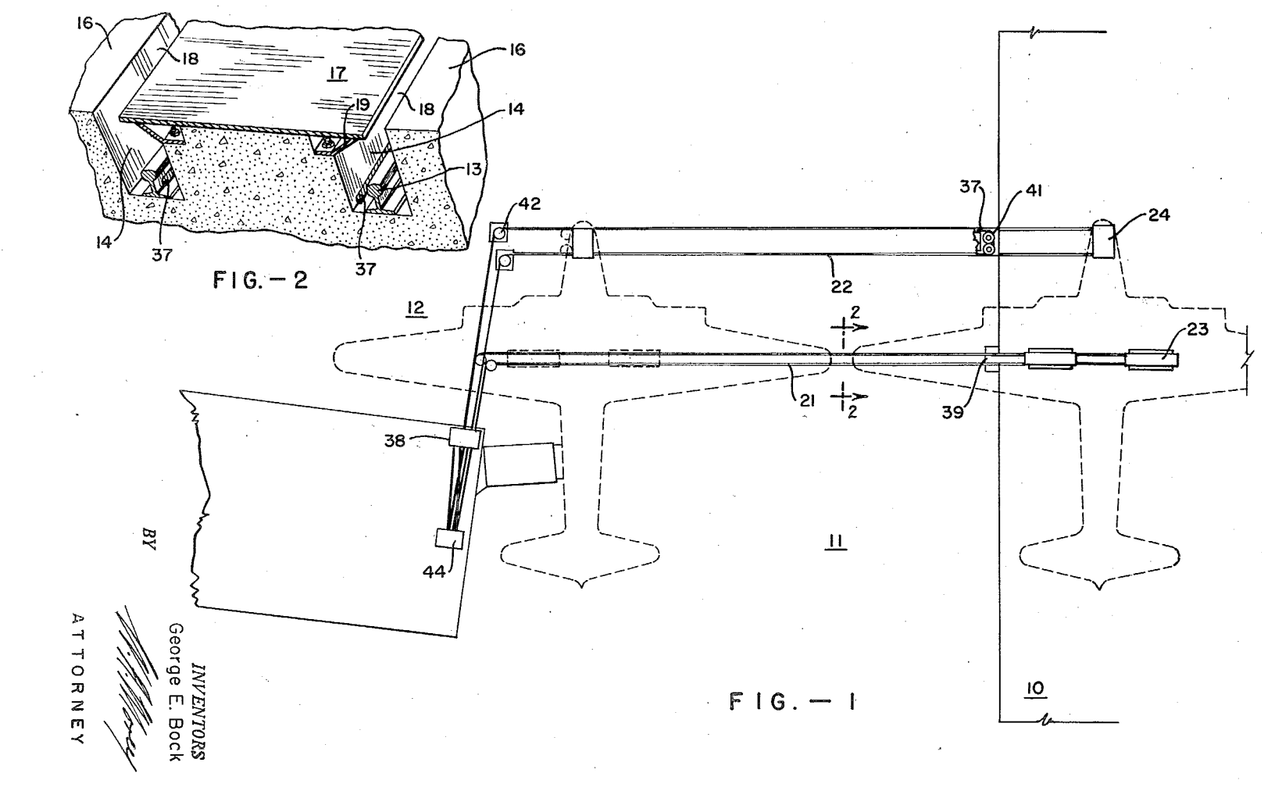
Fig. 1 is a schematic plan view illustrating the general arrangement of the subject apparatus.
Fig. 2 is a perspective cross section taken along the line 2—2 of Fig. 1.

For a more detailed description of the subject invention, reference is made to the appended drawings, in which Fig. 1 illustrates the general arrangement of the apparatus as applied to an airport having a taxiway 10, and apron 11, and a parking or loading zone 12. Spaced parallel rails 13 (Fig. 2) extend from the parking zone 12 transversely across the apron and into the taxiway 10, at least the portion of the rails 13 projecting into the taxiway 10 being disposed in narrow parallel trenches 14 formed in the taxiway 10.

The rails 13 are suitably mounted in the bottom of the trenches 14, the latter being of sufficient depth to dispose the upper extremity of the rails 13 well below the taxiway surface, indicated at 16. A cover 17 extends across the portion of the taxiway disposed between the trenches 14 and may suitably be formed of steel plate or the like. The surface of the cover 17 is preferably at a level slightly below the level of the taxiway surface 16 and projects laterally over trenches 14, thereby defining a narrow slot 18 over each trench. The edges of the cover 17 may be supported by legs 19 secured at one edge to the under surface of the cover 17 and near their opposite edges to the taxiway 10.

Figure 3:
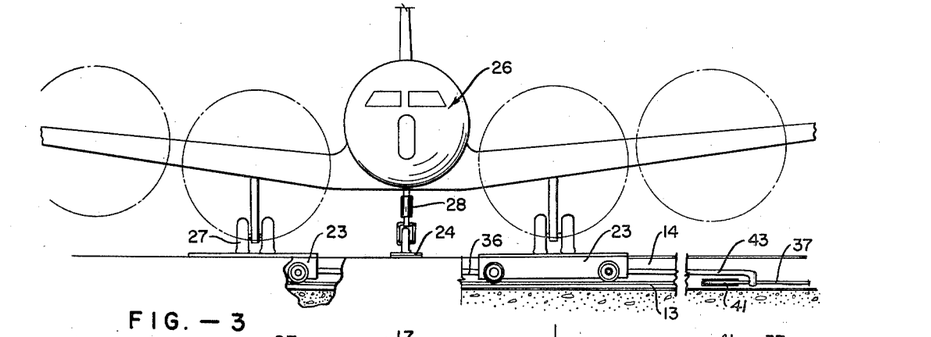
Fig. 3 is a partially broken away elevation of the apparatus.
Figure 4:
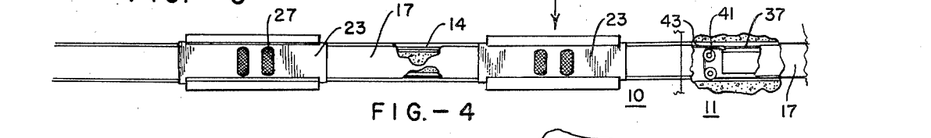
Fig. 4 is a partial plan view of a portion of our apparatus.

The form of apparatus illustrated in Fig. 1 utilizes two spaced parallel sets of rails 13, indicated at 21 and 22, permitting concurrent movement of a main landing wheel car 23 and a nose wheel car 24. The structure and arrangement of the main landing wheel car will be best understood by reference to Figs. 3 and 4, in which I have indicated a conventional aircraft 26 having transversely spaced main landing wheels 27 disposed under the aircraft wings and a nose wheel gear 28 disposed forwardly from the wheels 27. Since the landing wheels 27 of conventional aircraft are usually spaced a substantial distance apart, the main wheel car may be formed of rigidly interconnected similar sections, each adapted to receive and support the main landing wheels 27.

Figures 10, 11:
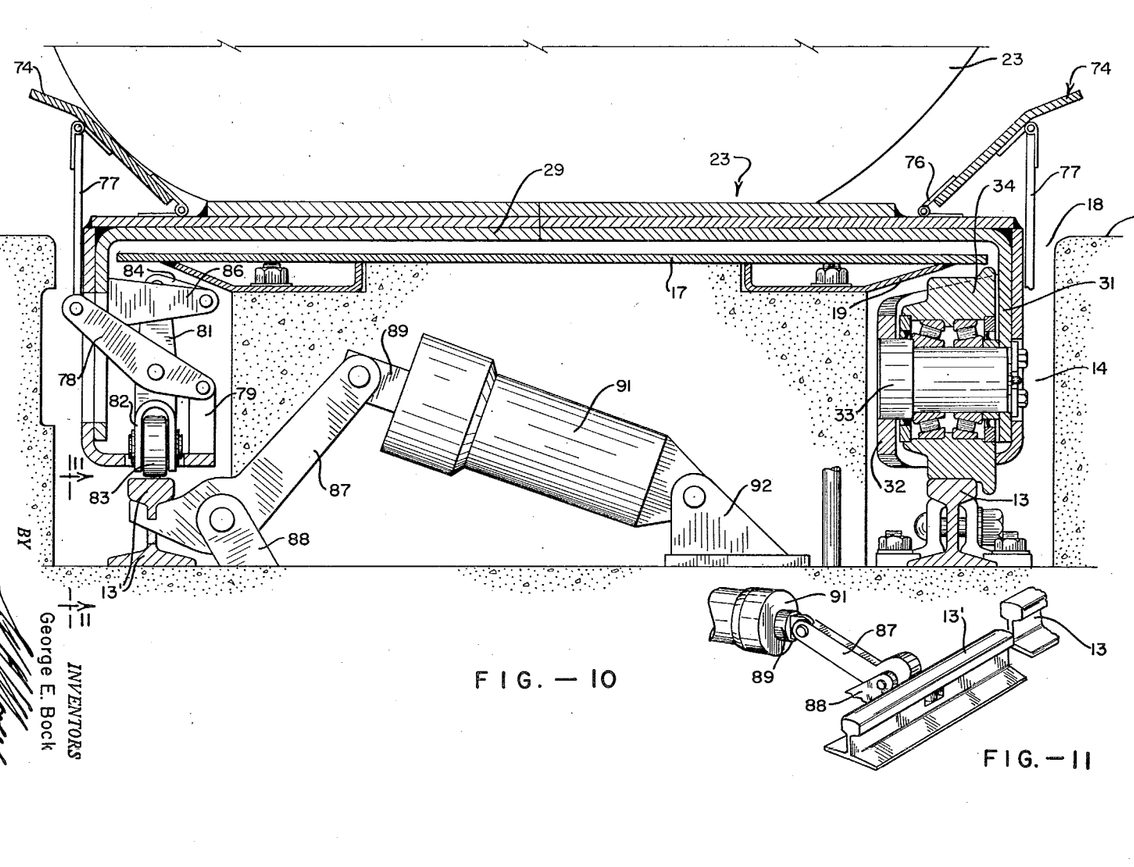
Fig. 10 is a partial elevation of a transfer car illustrating in greater detail a suitable wheel arrangement and apparatus for actuating the ramps carried by the transfer car.
Fig. 11 is a partial perspective view of a portion of the apparatus shown in Fig. 10.

The general structure of the car 23 is disclosed in Fig. 10 and includes a substantially flat horizontally disposed body 29 preferably built up by welding together a plurality of steel plates. Upright support members 31 are formed integrally with or secured along their edges to the body 29 and extend downwardly into the trenches 14 through the slots 18. The distance between the upper surface of the cover 17 and the lower surface of the body 29 should be as small as possible consistent with efficient operation of the apparatus in order to reduce to a minimum the difference in level between the taxiway surface 16, the level of the surface of the cover 17, and the level of the surface of the body 29. Since the load to be carried by the body 29 is large, the upright members 31 are usually continuous and built up from a plurality of welded plates. A heavy U-shaped member 32 (Fig. 10) is secured at its ends to the inner surface of the upright member 31 and is bored to receive a wheel axle 33 suitably supported at its opposite end by the support 31.

Rail wheels 34 are journaled on the axle 33 and engage the rails 13, supporting the body 29 for movement along the rails at the desired height. The main wheel car 23 is usually formed in two spaced sections, each rigidly connected with the other by bars 36 (Fig. 3) extending through the trenches 14 below the taxiway surface 16. The nose wheel car 24 is preferably similar in construction to the car 23 but its greatest dimension is usually parallel to the direction of aircraft movement. The main landing wheel transfer car 23 and, if desired, the nose wheel car 24 are preferably moved between their loading and unloading position on the taxiway 10 and the parking zone 12 by cables 37 driven by a suitable winch 38, preferably disposed in concealed position in or near the parking zone 12.

Figure 7:
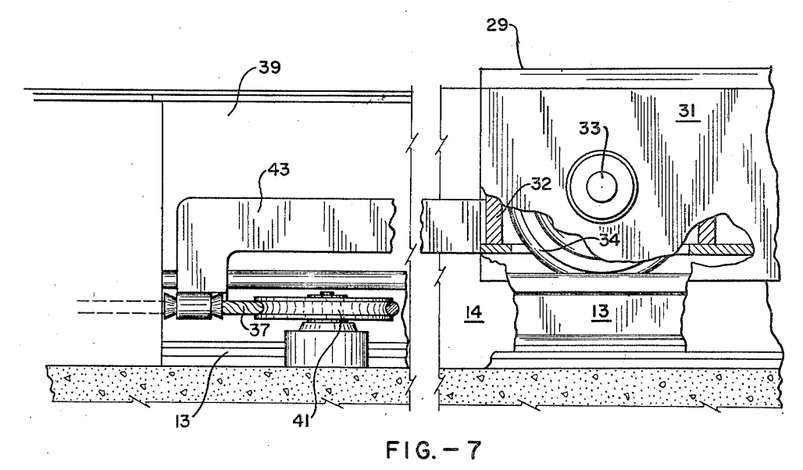
Fig. 7 is a partially broken away partial elevation of a portion of the subject apparatus illustrating the relationship between the cable-driving means and the transfer car.
Figure 8:
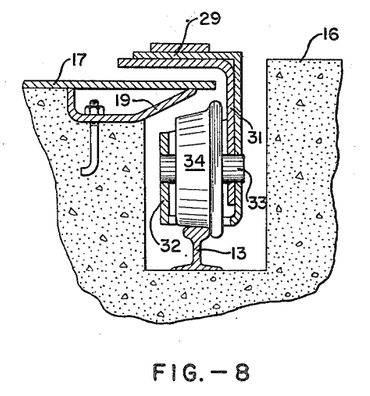
Fig. 8 is a partially sectioned elevation through a portion of the transfer car and rail indicating the method of wheel mounting.
Figure 9:
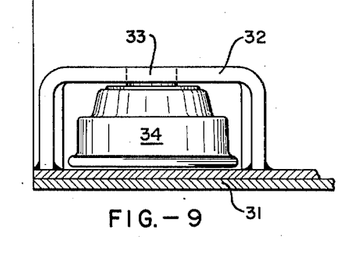
Fig. 9 is a partial plan view of the wheel arrangement shown in Fig. 8.

To avoid the construction of covered pits on the taxiway, I form pits, indicated at 39 (Fig. 1) in the apron 11 near the taxiway. A pair of rotatably mounted horizontally disposed sheaves 41 are mounted in the pit 39 to guide the cable 37. Additional sheaves 42 may be mounted in similar pits at appropriate locations to lead the cables from the winch 38 around the sheaves 41. The cables 37 employed for driving each car are in effect continuous and are looped around the drum of the winch 38 in such manner that as the winch drum is driven in one direction, the cable will travel in say a generally clockwise direction; and upon reversal of the direction of movement, in the opposite, or counterclockwise direction. A rigid arm 43 (Figs. 3 and 7) is secured at one end to the car 23 and extends transversely through the trench 14 below the cover 17 into engagement with the cable 37 to which it is rigidly fastened. Thus, by movement of the winch drum, the cars can be driven back and forth along the rails 13 in perfect synchronization.

Figures 5, 6:
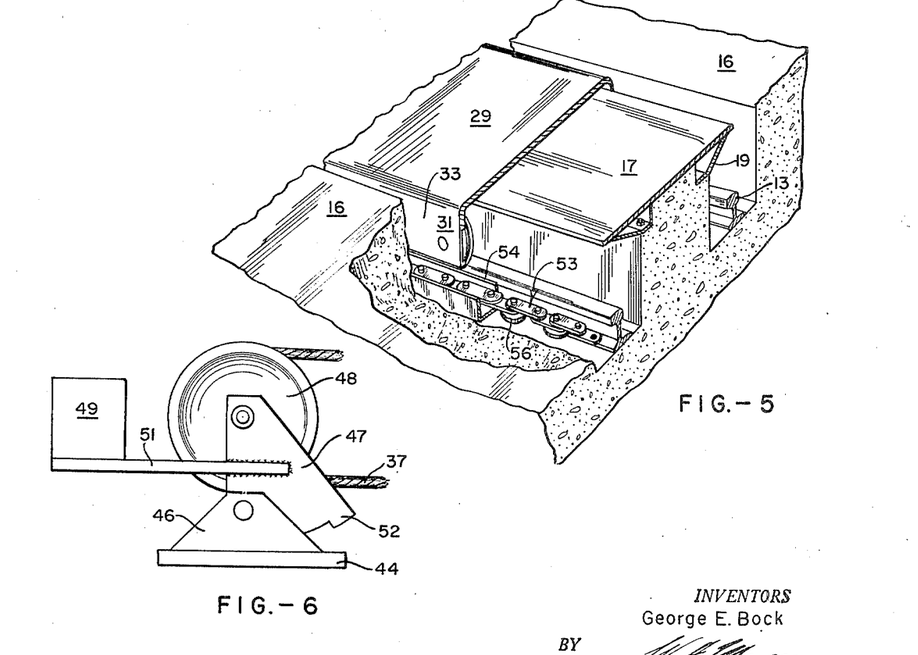
Fig. 5 is a partially broken away perspective of a portion of our apparatus illustrating the application of chain members to a transfer car for movement thereof.
Fig. 6 is a diagrammatic elevation of a cable tensioning device.

To keep the cable 37 taut, it is usually necessary to provide a form of cable-tensioning device such as that indicated in Fig. 6. This device may suitably include a base 44 having upstanding ears 46 to which a member 47 is pivotally secured near one end thereof. The shaft of a sheave 48 is journaled in the upper portion of the members 47 and receives the cable 37. A counter weight 49 is supported by an arm 51 secured at its opposite end to the member 47 in such position as to urge the sheave 46 in a direction opposing the tension of the cable 37. Preferably, a suitable stop 52 limits movement of the sheave 48 in the opposite direction.

As an alternative to the cable arrangement described, the structure illustrated in Fig. 5 may be utilized. In this modification, a chain, generally designated 53, running in a suitable channel 54 disposed in the trench 14 is substituted for the cable and is provided with a plurality of generally horizontal wheels 56 adapted to engage the sides of the channel 54 when longitudinal compressive stress is applied to the chain 53. The car 23 is secured to the chain 53, which is in turn driven by suitable power mechanism (not shown). Thus, when the car 23 is drawn from the taxiway 10 to the loading zone 12, the chain 53 is under tension and operates in a conventional manner. When the direction of chain movement is reversed, however, the links of the chain tend to assume an angular position limited by the channel 54, bringing the wheels 56 into engagement with the sides of the channel, thus providing in effect a rigid compressive member for forcing the car 23 from the parking zone 12 outwardly on to the taxiway 10. Obviously when such a drive mechanism is employed, only a single run of chain is required. This modification is generally satisfactory for movement of the car over short distances, but for general use it is considered less satisfactory than the cable arrangement previously described.

Figure 21:
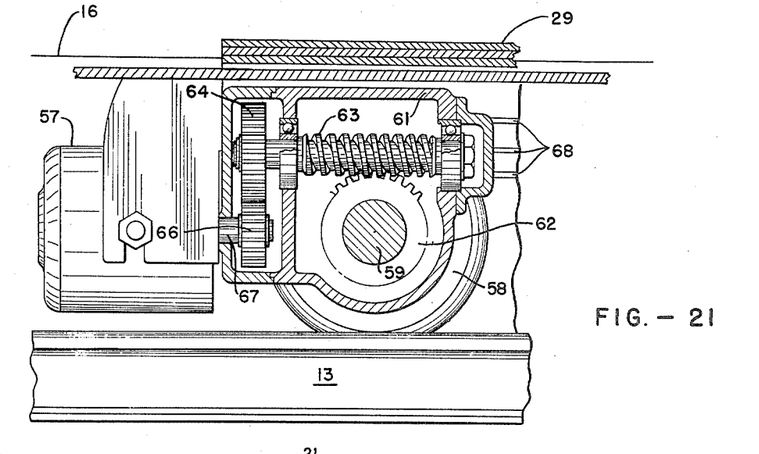
Fig. 21 is a partly broken away elevation of a portion of a modified form of transfer car.
Figure 22:
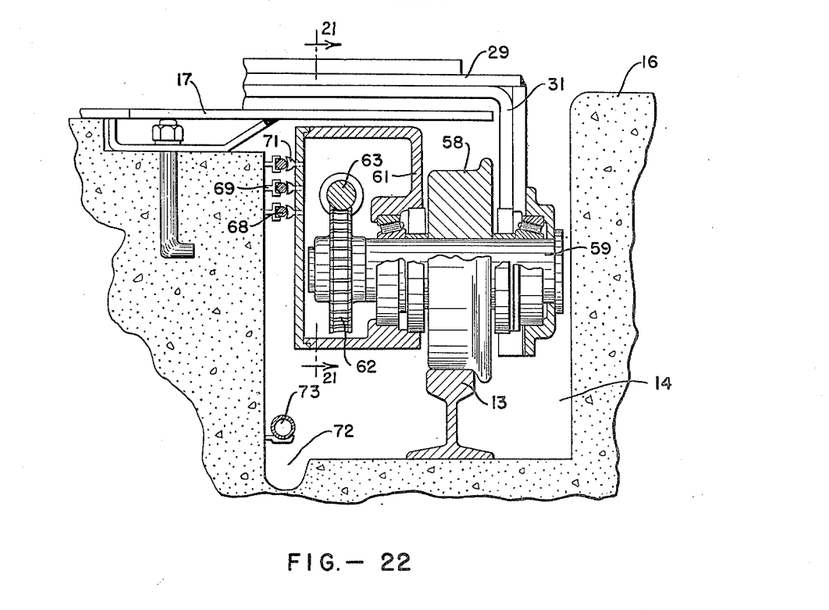
Fig. 22 is a partial transverse section through the device illustrated in Fig. 20.

If it is necessary to switch the cars 23 and 24 from one set of tracks to another, it is usually desirable to provide the cars with motors 57 (Figs. 21–22). When this is necessary, I provide rail wheels 58 secured to axles 59, each of the latter being suitably journaled in the uprights 31 and in gear boxes 61 secured to the uprights 31. A worm gear 62 is secured to each axle 59 and meshes with a worm 63 journaled in the gear box 61 and driven by a spur gear 64 meshing with a second spur gear 66 keyed to the shaft 67 of motor 57. A plurality of conductors 68 are supported by suitable insulating brackets 69 within the trench 14 for engagement with trolley runners 71 carried by the car 23 for transmitting electric energy to the motors 57. Ordinarily, each separate section of the main landing wheel transfer car 23 and the nose wheel car 24 will require at least four rail wheels, although a greater number may be employed when required by circumstances. When the motorized type of car illustrated in Figs. 21–22 is employed I prefer to drive each of the wheels by a separate motor 57, since under such circumstances the motors will be smaller and more easily disposed within the trench 14 below the taxiway surface 16.

In certain areas adverse weather conditions may be expected, as for example excessive rain, snow, or ice. In these areas it may be desirable to provide a drainage trench 72 formed in the bottom of the trench 14. If snow and ice are expected, a suitable heating element 73, such as a steam pipe or water proof electric resistance element may also be mounted in the trench 14 to assist in keeping the trench clear of foreign materials.

To aid in moving the aircraft landing wheels on to the transfer cars and holding these wheels in position on the cars, edge ramps, generally designated 74, are preferably provided at least on the opposite edges of the main landing wheel transfer car 23, and when possible in corresponding position on the nose wheel car 24. The ramps 74 (Fig. 10) are heavy sections of plate having a hinge 76 along one edge, the hinge 76 being secured to the edge portion of the body 29 of the transfer car 23 near the upright support members 31. The free end of the ramps 74 is usually bent downwardly to engage the taxiway surface 16 when the ramp 74 is in lowered position. Various means are provided for raising the ramps 74 and for holding these ramps in raised position when it is desired to prevent unintentional movement of the aircraft landing wheels 23.

The ramps 74 preferably extend continuously along the edge of each of the sections of the main wheel car 23. Only the ramp-actuating mechanism necessary to operate one of the ramps will be described, it being understood that similar mechanism is employed to actuate each of the ramps required regardless of whether they are disposed on the main wheel transfer car 23 or the nose wheel car 24.

The form of ramp-actuating device illustrated in Fig. 10 utilizes a rigid upright member 77 hinged at its upper extremity to the under side of the ramp 74 and pivoted at its lower end to the outer extremity of a lever 78. The opposite end of the lever 78 is pivoted to a member 79 fixed to the car 23 and is also pivotally secured intermediate its ends to an upright arm 81, the lower portion of which is provided with a clevis 82 in which a cam wheel 83 is journaled. The upper end of the arm 81 is pivotally secured to an end of arm 84, the opposite end of which is pivoted to an end of an arm 86, the latter being secured to the car 23. Thus, as the cam wheel 83 is moved up and down, the motion will be translated through the levers to the ramp 74, thereby raising and lowering the free end of the ramp. In operation, the ramps 74 will be maintained in a raised position at all times except when aircraft are being moved onto or off of the transfer cars, during which time the cars will be disposed on the taxiway 10. The cam wheel 83 is therefore disposed in such manner as to run along the surface of rail 13 in which position the ramp 74 is supported in raised position.

To lower the ramp 74, a section 13' of the rail 13 is mounted for vertical movement and is engaged by an end of an operating lever 87. The lever 87 is pivoted between its ends on suitable supports 88 and pivotally engages at its opposite end a piston rod 89 of fluid power cylinder 91. The cylinder 91 is pivotally supported by a member 92 mounted in a pit formed below the cover 17 for receiving the cylinder 91. Thus, when it is desired to lower the ramp 74, the transfer car 23 is moved into position on the runway with the cam wheel 83 in position on the rail section 13'. When in this position, the rail wheels of the car 23 engage the conventionally supported rail 13. Actuation of the cylinder 91 effects a lowering of the rail section 13', permitting the cam wheel 83 to drop relative to the car 23, thereby lowering the ramp. It will be obvious that the car can not be moved while the ramp is lowered, due to the difference in level between the rail 13 and the rail section 13'. This constitutes a desirable safety feature.

The structure illustrated in Fig. 10 is, however, subject to certain defects. For example, it is relatively expensive, requires the use of a relatively powerful operating cylinder 19, and does not permit downward movement of the ramps 74 under excessive pressure such as might be caused by movement of a heavily loaded aircraft across the car 23 at relatively high speed. For maximum safety the ramp should under such circumstances move downwardly without disrupting the ramp-operating mechanism and yet should resist such movement with sufficient force to prevent accidental movement of the landing wheels from the transfer car.

This may be accomplished by utilizing a form of ramp-actuating device illustrated in Figs. 12–16. As shown diagrammatically in Figs. 12 and 13, ramp 74 is pivotally attached to the car 23 in a manner similar to that previously described. The ramp 74 is also pivotally secured at its lower surface to the upright member 77, which projects downwardly into the trench 14. At its lower end, the member 77 is pivotally secured to lever arm 93, which extends inwardly through a suitable opening 94 in the support 31 into rigid engagement with a torsion tube 96 (Figs. 15–16) disposed behind the upright 31 and below the body 29 of the car 23. The tube 96 is rotatably supported by suitably spaced bearings 97 and is secured at one end to a polygonal torsion bar 98 for the transmission of torque, the bar extending through the tube 96 and being secured at its opposite end to an arm 99. A link 101 pivotally connects an extremity of the arm 99 with an extremity of an arm 102, the opposite end of which is keyed to a rotatably mounted shaft 103. Another arm 104 is also keyed at one end to the shaft 103 for movement with the arm 102. A link 106 is pivoted to the end of the arm 104 and projects downwardly into pivotal engagement with an extremity of a bell crank 107 pivotally supported near its midpoint by a pin 108, which is in turn supported by the structure of the car 23.

Figure 12:
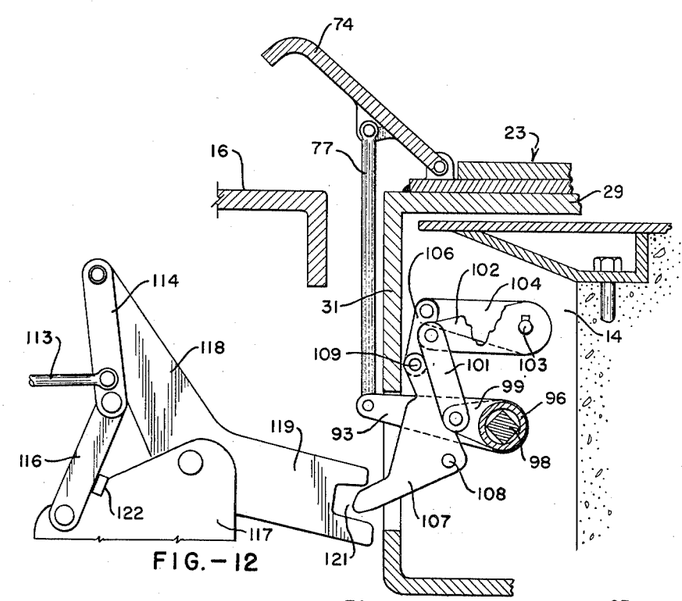
Fig. 12 is a partial schematic elevation of a preferred form of ramp-actuating mechanism illustrating the position of the component parts thereof when the ramp is raised.

The bell crank and the arm 106 form in combination a toggle having a center pin 109, the movement of which in a counter-clockwise direction, as in Fig. 12, is limited by the upright member 31. The opposite end of the bell crank 107 projects outwardly through the opening 94 and somewhat beyond the outer extremity of the upright 31. A pit 111 is formed in the taxiway 10 outwardly from and adjoining the trench 14 to receive a fluid power operating cylinder 112 pivotally fixed at one end to the taxiway and having a piston rod 113 pivotally engaging a link 114 intermediate its ends. One extremity of the link 114 is pivotally joined to a second link 116, the opposite end of which is pivoted to a suitable support 117. The other extremity of the link 114 is pivoted to a generally L-shaped lever 118 fulcrumed near its midpoint to a support 117, said lever including an outer end 119 projecting outwardly into the trench 14. The outer end 119 is notched, as indicated at 121, for engagement with the outwardly projecting end of the bell crank 107 when the car 23 is in position on the taxiway for receiving or discharging aircraft. Suitable stops 122 may be provided for limiting movement of the link 116.

Figure 13:
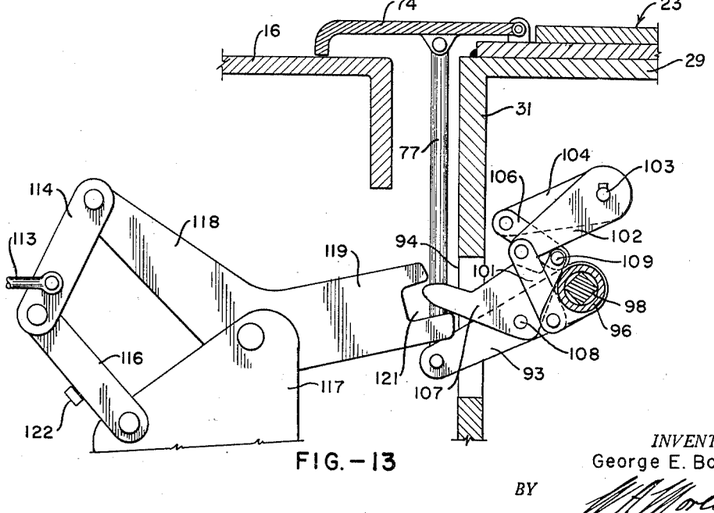
Fig. 13 is a partial schematic elevation of the device illustrated in Fig. 11 showing the position of the component parts when the ramp is lowered.
Figures 14, 15, 16:
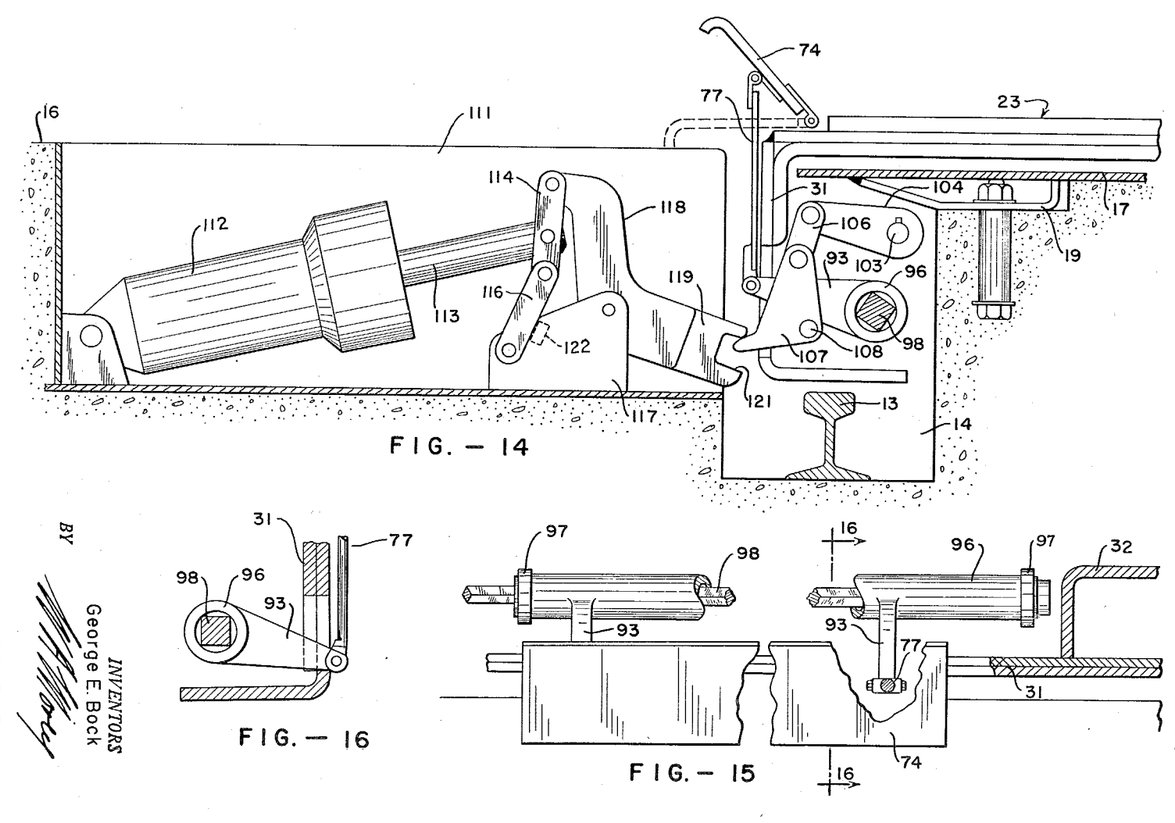
Fig. 14 is a partial cross section through the device shown in Figs. 11 and 12.
Fig. 15 is a partial plan view of the device shown in Fig. 13.
Fig. 16 is a partial vertical cross section along the plane 16—16 in Fig. 15.

The operation of the above-described ramp-operating mechanism will be best understood by reference to Figs. 12 and 13. Assuming that the ramps 74 are in raised position, the car may be moved along the rails until it reaches the desired position on the taxiway 10. As the car moves along the rails into position, the projecting end of the bell crank 107 will slide into the notch 121 on the outer end of the lever 118. In this position it will be understood that the piston rod 113 is in its extended position so that the outer end 119 of the lever 118 is lowered. The torsion bar 98 and the torsion tube 96 constitute in combination a strong torsion type of spring which yieldingly forces the member 77 and the ramp 74 upwardly. The strength of this spring is sufficient to maintain the ramp in raised position against all ordinary forces, but will permit downward movement of the ramp 74 in the event aircraft landing gear is moved against the ramp with considerable force, such as for example might be occasioned by aircraft taxiing over the car 23. Under such circumstances the arms 99 will not be moved by downward movement of the ramp 74, such movement being blocked by the toggle formed by the link 106 and the bell crank 107 bearing against the upright 31.

To lower the ramp 74, the cylinder 112 is actuated to draw the piston rod 113 into the cylinder. This causes upward movement of the outer end 119 of the lever 118, bringing the lips of the notch 102 into engagement with the projecting end of the bell crank 107 and rotating that member about a pin 108 in a clockwise direction, as seen in Fig. 12. The pin 109 will therefore also move in a clockwise direction, releasing the toggle and allowing downward movement of the arm 104 and rotation of shaft 103 in a counterclockwise direction. This movement forces arm 99 in a counterclockwise direction, together with the bar 98 and the tube 96, thus lowering the arms 93 and the member 77.

From the foregoing it will be seen that the car 23 can be moved along the rails with the arms 74 in either raised or lowered position and will also move into engagement with the lever 118 when the car is brought into position on the taxiway. Once the car has been moved from the taxiway, the ramps will remain in position unless subjected to extreme force, under which circumstances they will move downwardly without altering the condition of the arm and lever mechanism carried by the car for actuating the ramp. Since the length of the tube 96 and the bar 98 is usually coextensive with the ramp 74, or approximately so, only one lever and arm mechanism is required for each ramp. The fluid cylinders 112 are, of course, controlled remotely in known manner by an operator.

The structure of the shaft 103 and the spacing of the arms 102 and 104 thereon may if desired be such as to permit the shaft 103 to act as an additional tension bar spring, or alternatively to replace the spring formed by tube 96 and bar 98.

Figure 17:
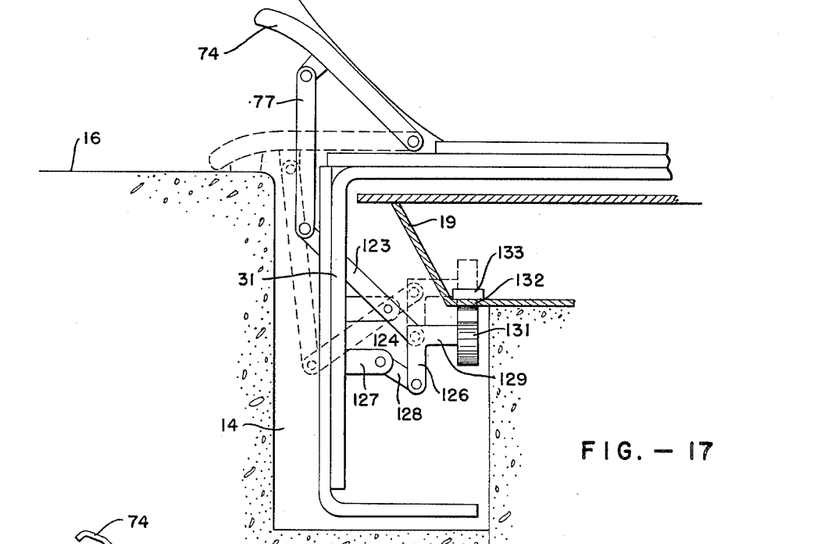
Fig. 17 is a partial schematic elevation of a modified form of ramp-actuating device.
Figure 18:
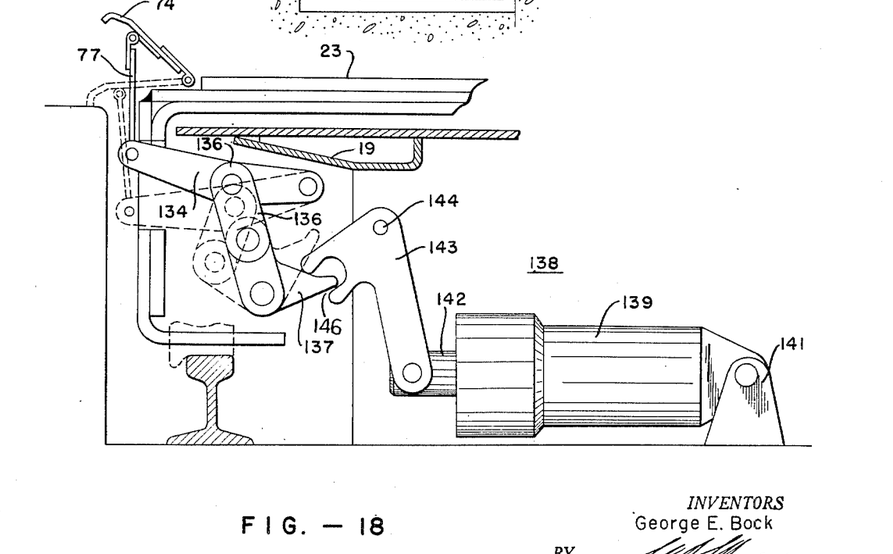
Fig. 18 is a partial schematic elevation of a modified form of ramp-actuating device.

If the height of the ramp 74 is such that airplane landing gear can pass over it without danger, or if for other considerations resilient support of the ramp is considered unnecessary, mechanisms of the type illustrated in Figs. 17 and 18 may be utilized. In Fig. 17, the member 77 pivoted to the under side of the ramp is pivotally secured at its opposite end to a lever 123 fulcrumed intermediate its ends to a support 124 carried by the upright member 31 of the car 23. The opposite end of the lever is pivotally secured to the upper extremity of an upright leg 126. A second support 127 also secured to the member 31 is disposed below the support 124 and pivotally engages an extremity of a link 128, the opposite end of which is pivoted to the lower extremity of the leg 126. A generally horizontal leg 129 projects laterally from the leg 126 and rotatably supports a cam wheel 131, which normally engages a flat horizontally disposed portion 132 of the leg 19. When the wheel 131 is in engagement with the under surface of the portion 132, the ramp 74 is supported in raised position. As the car 23 approaches a predetermined position on the taxiway 10, the wheel 131 moves along an inclined portion 133, also formed in the leg 19 and projecting upwardly from the portion 132. This permits upward movement of the wheel 131 and therefore lowers the ramp 74. When in fully lowered position, the wheel 131 may project through an opening formed in the flat portion 132 beyond the inclined portion 133, it being necessary only that the upper extremity of the inclined portion 133 be disposed above the axis of the wheel 131. With this type of ramp-actuating device, the ramp will be lowered when the car is in receiving or discharging position on the taxiway and will be raised when the car is in other positions.

In the device illustrated in Fig. 18, the upright member 77 is pivoted at its lower end to the outer extremity of a lever 134, the opposite end thereof being pivotally secured to and carried by car 23. A toggle link 136 is pivotally attached to lever 134 between its ends, the other end being pivoted to a leg of a bell crank 137, pivotally secured near its midpoint to the car 23. The other leg of the bell crank 137 projects inwardly towards the inner wall of the pit 14. A pit 138 formed in the taxiway 10 below the cover 17 contains a fluid-actuated cylinder 139 pivotally secured at one end to a suitable support 141 and has a piston rod 142 pivotally engaging a leg of a bell crank 143. The bell crank 143 is pivotally mounted as by a pin 144 and is provided with a notch 146 in the extremity of its outer leg, which projects outwardly into the pit 14 in the path of the projecting leg of the bell crank 137. If the piston rod 142 is extended while the car 23 is in loading position on the taxiway, the notch 146 is moved upwardly, bringing the lips of the notch into engagement with the bell crank 137 and rotating the bell crank in a counterclockwise direction, as seen in Fig. 18. This forces the ramp 74 downwardly into lowered position. Reverse movement of the rod 142 raises the ramp 74. The joint between the link 136 and the crank 137 is constructed in such manner as to limit clockwise movement of the bell crank 137, thereby locking the ramp in raised position. The car 23 may be moved to the parking area with the ramps raised and upon return the projecting leg of the bell crank 137 will again engage the notch 146. Extension of the piston rod 104 rotates the bell crank 137 in a counterclockwise direction, which releases a toggle formed by the bell crank 147 and link 136, thereupon permitting downward movement of the ramp 74.

Figure 19:
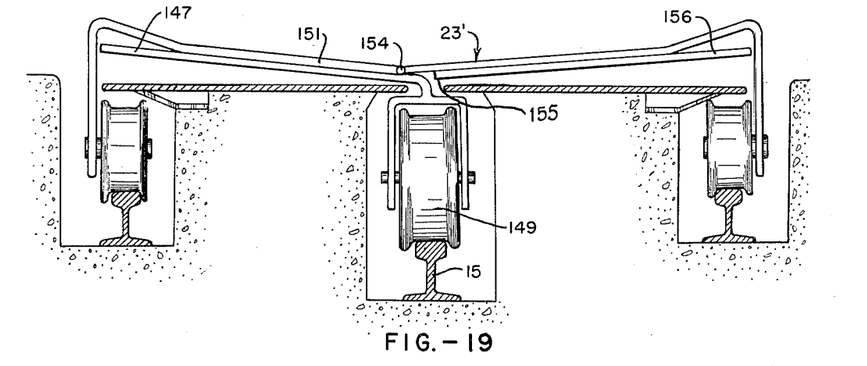
Fig. 19 is a partial section through a modified form of transfer car illustrating the disposition of component parts thereof when disposed for transferring aircraft.
Figure 20:
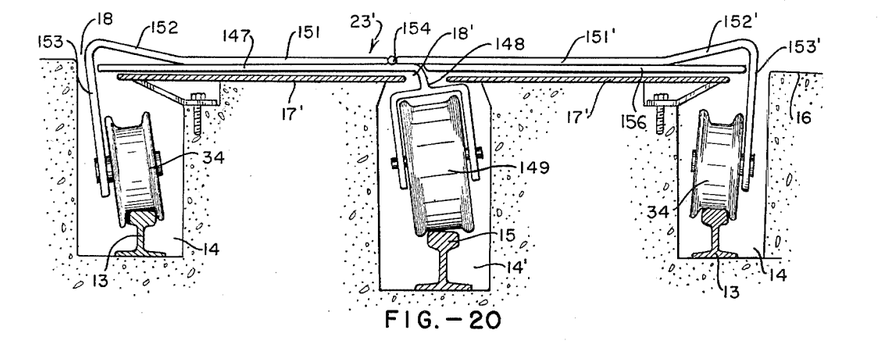
Fig. 20 is a partial schematic elevation of the transfer car shown in Fig. 18, but with the component parts disposed in position for receiving aircraft landing gear.

As illustrated in Figs. 19 and 20, I may substitute for car 23 a car 23', which does not require the use of edge ramps 74. The car 23' utilizes spaced parallel pits 14 having rails 13 disposed therein, as previously described. In addition, however, a pit 14' is formed in the runway and in the apron between the pits 14 and is somewhat deeper. A rail 15 is mounted therein. The cover 17 is divided into two similar sections 17' and defines a slot 18' over the trench 14'. The car 23' is formed of a generally flat elongated plate 147, the inner end of which is bent downwardly into and through the slot 18' and which is secured to a clevis 148, in which is journaled rail wheel 149. The plate 147 is secured as by welding to an upper plate 151, which is bent upwardly along its outer edge, forming an inwardly sloping ramp 152. An upright 153' extends downwardly from the outer extremity of the ramp 152 through the slot 18 and into the trench 14 in a manner similar to the upright 31. Rail wheels 34 are journaled to the lower portion of the upright 153. The inner edge of the plate 151 is pivotally secured as by a hinge 154 to another plate 151', similar to plate 151, but extending laterally in the opposite direction. The plate 151' includes a ramp 152' and an upright 153' to which rail wheels 34 are journaled. A plate 156 is secured as by welding to the under side of the plate and is flat, extending from upright 153' inwardly to the curved portion of the plate 147. The inner edge of the plate 156 abuts the curved portion of plate 147, but is not secured thereto, thereby permitting pivotal movement of one side of the car 23' with respect to the other.

It will be seen that as the wheel 149 is raised or lowered with respect to wheels 34, the central portion of the car 23' will move up and down. Thus, as the car 23' is positioned in the taxiway 10 (Fig. 20), the level of the surface of the rail 15 is relatively close to the level of the surface of the section 17', thereby holding the body of the car in a substantially horizontal plane with the upper portions of the ramps 152, 152' only slightly above the surface 16 of the taxiway. When the landing wheels of an aircraft are suitably positioned on the car 23' it is moved along the rails 13 and 15 towards the parking zone 12. As this movement progresses, the difference in elevation between the rails 13 and the rail 15 is increased, as by raising the level of the rails 13. The ramps 152, 152' are therefore elevated with respect to the central portion of the car 23', thereby engaging and holding the landing wheels against accidental displacement.

It will be obvious to those skilled in the art that certain of the details hereinbefore described may be varied without departing from the true spirit and scope of my invention. I do not therefore limit myself to these details, except insofar as defined in the appended claims.

I claim:

1. Apparatus for moving an aircraft having landing gear including forward and rear units at an airport having a taxiway and parking zone, comprising spaced rails extending from the parking zone into the taxiway, at least the portion of the rails in the taxiway having their upper surfaces supported below the surface of the taxiway, stationary means extending between the rails on the taxiway slightly below the level of the taxiway surface for supporting aircraft landing gear and defining narrow elongated openings above the rails, a transfer car for movement along the rails including a substantially flat body section above the said stationary means for receiving an aircraft landing gear unit, said body section having substantially continuous straight longitudinal edges above the level of the elongated openings, upright support members extending downwardly through the elongated openings from the said edges of the body, and rail wheels journaled to the support members for movement along the rails, said wheels and support members maintaining the upper surface of said body in a plane slightly above the plane of the taxiway surface while said car is on the taxiway, and power means for moving the car along the rails.

2. The structure defined in claim 1 wherein the power means for moving the car along the rails includes a continuous rigid channel mounted below the stationary means near one of the rails, a chain comprising a series of rigid links, pins pivotally connecting the links, and rollers carried by the pins for engagement with the channel when the chain is longitudinally compressed, said chain being movably disposed in said channel, means connecting the chain to the car and means for applying longitudinal compression and tension to the chain for moving the car in either direction.

3. Apparatus for moving between a taxiway and a parking zone an aircraft having landing gear including main and end units comprising first and second pairs of spaced parallel rails extending between the parking zone and the taxiway, said pairs being spaced apart substantially the distance between said main and end landing gear units, a portion of the first pair of rails extending into the taxiway and being disposed in trenches with the upper surface of each rail disposed below the level of the taxiway surface, stationary substantially continuous flat aircraft supporting means independent of the rails and overhanging one edge of each of the trenches to define a slot over each of said trenches sufficiently narrow and sufficiently close to the level of the taxiway surface to permit safe traverse by said landing gear units, separate cars for supporting said landing gear units disposed over said pairs of rails including a car for supporting said main landing gear unit movable on said first pair of rails and comprising a substantially flat and unobstructed horizontal body, uprights extending from the sides of said body through said slots, wheels carried by said uprights bearing on the rails beneath said slots and positioning said body above and close to the level of the taxiway between said trenches whereby movement of said landing gear units onto and over said car is substantially unobstructed, and means propelling said cars along said rails to move the aircraft between said taxiway and parking zone.

4. Apparatus for moving between a taxiway and a parking zone an aircraft having landing gear including main and end units comprising two pairs of spaced parallel trenches extending from the parking zone into the taxiway, said pairs being spaced apart substantially the distance between said main and end landing gear units, a rail in each trench having its upper surface disposed below the level of the taxiway surface, stationary substantially continuous flat surfacing means disposed close to the level of the taxiway surface and overhanging portions of the trenches of one of said pairs to define a slot over each of said trenches sufficiently narrow and sufficiently close to the level of the taxiway surface to permit safe traverse by said landing gear units, separate cars for supporting said landing gear units disposed over said pairs of trenches including a car for supporting said main landing gear unit comprising a substantially flat horizontal body, uprights extending from the sides of said body through said slots, wheels carried by said uprights bearing on the rails beneath said slots and positioning said body close to the level of said taxiway surface and with minimum clearance above said stationary means providing freedom of movement thereover, whereby movement of said landing gear units onto and over said car is substantially unobstructed and requires minimum elevation of said units above the level of the taxiway surface, and means propelling said cars along said trenches to move the aircraft between said taxiway and parking zone.

5. Apparatus for moving an aircraft having landing gear including main and end units at an airport having a taxiway and a parking zone comprising first and second sets of spaced rails, each parallel to the other and extending from the parking zone to the taxiway, the distance between said sets of rails being substantially equal to the distance between the main and end landing gear units, the rails of the first set extending into the taxiway and being disposed in trenches with the upper portion of each rail below the surface of the taxiway, stationary substantially continuous means in the taxiway between the rails of said first set close to the level of the taxiway for supporting aircraft landing gear and defining with the taxiway narrow elongated openings above the level of the rails, an end unit car movable along the second set of rails for receiving the end landing gear unit of an aircraft, a main unit car movable along the first set of rails for receiving the main landing gear unit, the main unit car having a substantially flat unobstructed body extending across the taxiway above said stationary means, upright support members extending downwardly from the body into the elongated openings, and rail wheels journaled to the upright support members for movement along the rails, said wheels and support members being disposed and arranged for maintaining said body in a substantially horizontal position close to the level of the taxiway surface and with minimum clearance above said stationary means providing freedom of movement thereover, ramp means movably secured along both side edges of the main unit car, means for moving said ramp means between a raised and lowered position, and power means for moving the main unit car.

6. Apparatus for moving an aircraft having landing gear including main and end units at an airport having a taxiway and parking zone, comprising spaced rails extending from the parking zone into the taxiway, at least the portion of the rails in the taxiway being disposed in trenches with the upper rail surfaces supported below the surface of the taxiway, stationary substantially continuous means substantially at the level of the adjacent taxiway surface projecting horizontally over the trenches for supporting aircraft landing gear and defining with the taxiway narrow elongated openings above the level of each of the rails, a transfer car for the main landing gear unit, adapted for movement along the rails and including a solid top portion of substantially continuous uniform cross section throughout its length spanning the distance between the trenches, said top portion having flat continuous upper and lower surfaces and straight continuous longitudinal edge portions above the elongated openings, said car also including upright support members extending downwardly through said elongated openings from said edge portions of the top portion, rail wheels journaled to the support members for movement along the rails, said wheels and support members maintaining the flat upper surface of said top portion in a plane close to the level of the plane of the immediately adjacent taxiway surface, power means for moving the car along the rails, and ramp means movably secured to each of said edge portions of the top portion for movement between raised and lowered positions.

7. Apparatus for moving an aircraft having landing gear including forward and rear units at an airport having a taxiway and parking zone, comprising spaced rails extending from the parking zone into the taxiway, at least the portion of the rails in the taxiway having their upper surfaces supported below the surface of the taxiway, stationary means extending between the rails on the taxiway substantially at the level of the taxiway surface for supporting aircraft landing gear and defining narrow elongated openings above the rails, a transfer car for movement along the rails including a substantially flat body section of substantially uniform cross section above said stationary means for receiving an aircraft landing gear unit, said body section having substantially continuous straight longitudinal edges above the level of the elongated openings and a flat upper surface free of obstruction to the passage of aircraft wheels, upright support members extending downwardly through the elongated openings from the said edges of the body, and rail wheels journaled to the support members for movement along the rails, said wheels and support members maintaining the upper surface of said body in a substantially horizontal plane substantially coinciding with the plane of the taxiway surface while said car is on the taxiway, ramp means along an edge of the car for movement between a raised position and a lowered position, means for raising and lowering the ramps, and power means for moving the car along the rails.

8. Apparatus for moving an aircraft having landing gear including forward and rear units at an airport having a taxiway and parking zone, comprising spaced rails extending from the parking zone into the taxiway, at least the portion of the rails in the taxiway having their upper surfaces supported in trenches below the surfaces of the taxiway, stationary support means extending between the rails on the taxiway slightly below the level of the taxiway surface for supporting aircraft landing gear and defining narrow elongated openings over the rails, a transfer car for movement along the rails including a substantially flat body section above the said stationary support means for receiving an aircraft landing gear unit, upright support members extending downwardly through the elongated openings from the body, and rail wheels journaled to the support members for movement along the rails, said wheels and support members maintaining said body in a substantially horizontal plane generally near the plane of the taxiway surface while said car is on the taxiway, a ramp pivoted along one edge to an edge portion of the car, means engaging the ramp for moving the free edge of the ramp between lowered position near the taxiway surface and an elevated position above the car body, and means for moving the car along the rails.

9. Apparatus for moving an aircraft having landing gear including forward and rearward units at an airport having a taxiway and a parking zone comprising two pairs of spaced rails extending from the parking zone into the taxiway, each pair being parallel to the other and spaced apart a distance substantially equal to the distance between the forward and rear landing gear units, at least the portion of the rails extending into the taxiway having their upper surfaces supported substantially below the surface of the taxiway, stationary means extending between the rails of each pair of rails on the taxiway slightly below the level of the taxiway surface for supporting aircraft landing gear and defining narrow elongated openings over the rails, transfer cars movable along each of said pairs of rails for receiving aircraft landing gear including a main wheel car for receiving one unit of the landing gear and a nose wheel car for receiving the other unit of the landing gear, each of said cars having a substantially flat body extending across the taxiway above the stationary means, upright support members extending downwardly from the body into the elongated openings, rail wheels journaled to the upright support members for movement along the rails, said wheels and support members being disposed and arranged for maintaining said body in substantially horizontal position with the upper body surface slightly above the level of the adjacent taxiway surface, and means for moving the cars along the rails.

10. Apparatus for moving an aircraft having landing gear including forward and rear units at an airport having a taxiway and a parking zone comprising two sets of spaced rails extending from the parking zone into the taxiway, each set being parallel to the other set and spaced apart a distance substantially equal to the distance between the forward and rear landing gear units, at least the portion of the rails extending into the taxiway having their upper surfaces supported in trenches below the level of the taxiway surface, stationary cover means including metallic plates extending between the rails slightly below the level of the taxiway surface for supporting aircraft landing gear and having their margins extending over said trenches and defining narrow elongated openings over the rails, transfer cars movable along each of said sets of rails for receiving aircraft landing gear including a main wheel car on one set of rails for receiving a rear unit of the landing gear and a nose wheel car on the other set of rails for receiving the forward unit of the landing gear, said main wheel car having a substantially flat body extending across the taxiway above the stationary means, upright support members extending downwardly from the body into the elongated openings, and rail wheels journaled to the upright support members for movement along the rails, said wheels and support members being disposed and arranged for maintaining said body in substantially horizontal position slightly above the level of the taxiway surface, ramp means pivotally secured along an edge of the main wheel car, means for moving said ramp means between a raised and a lowered position, and power means for moving the main wheel car.

11. Apparatus for moving an aircraft having landing gear including forward and rear units at an airport having a taxiway and parking zone, comprising spaced rails extending from the parking zone into the taxiway, at least the portion of the rails in the taxiway having their upper surfaces supported in trenches below the surface of the taxiway, stationary support means extending between the rails on the taxiway slightly below the level of the taxiway surface for supporting aircraft landing gear and defining narrow elongated openings over the rails, a transfer car for movement along the rails including a substantially flat body section having an unobstructed surface above the said stationary support means for receiving an aircraft landing gear unit, upright support members extending downwardly through the elongated openings from the body, and rail wheels journaled to the support member for movement along the rails, said wheels and support members maintaining said body in a substantially horizontal plane slightly above the plane of the taxiway surface while said car is on the taxiway, elongated ramps each pivoted along an edge to the forward and rear edge portions of the car, an arm pivotally secured to each of the ramps, levers carried by the car and engaging said arms for forcing the ramps from a lowered to a raised position, means engaging the lever for holding the ramps in raised position, and power means for moving the car along the rails.

12. Apparatus for moving aircraft having transversely spaced main landing wheel units and a secondary landing wheel spaced longitudinally from the main landing wheels between a parking zone and an elongated taxiway comprising first and second sets of spaced parallel rails extending from the parking zone into the taxiway, at least the portion of the rails in the taxiway having their upper surfaces disposed below the surface of the taxiway, first and second transfer cars for movement along the first and second sets of rails respectively, the upper surface of each car being substantially flat and disposed at a level slightly above the level of the taxiway surface, said upper surface being substantially the highest fixed surface on the car and adapted for receiving and supporting a landing wheel unit, and power means for moving one of said cars independently of the other, whereby the diagonal distance between the cars may be varied.

13. Apparatus for transporting aircraft along an airport surface comprising in combination a pair of spaced parallel rails disposed in spaced parallel trenches formed in the airport surface, the upper surface of each of the rails being below the airport surface, rigid support means extending partially over each of the trenches near the level of the airport surface and defining elongated longitudinal slits over the trenches, a transfer car for movement along the rails, said car having a flat solid body section of substantially uniform longitudinal cross section extending over the rigid support means between the slits, the surface of said body being slightly above the level of the airport surface for receiving an aircraft landing gear unit, substantially continuous upright members extending downwardly from each side of the body section into said slits, and rail wheels rotatably supported by the upright members, the surface of the body section being substantially the highest fixed point on the car.

14. Apparatus for transporting aircraft along an airport surface comprising in combination a pair of spaced parallel rails disposed in spaced parallel trenches formed in the airport surface, the upper surface of each of the rails being below the airport surface, rigid support means extending partially over each of the trenches slightly below the level of the airport surface and defining elongated longitudinal slits over the trenches, a transfer car for movement along the rails, said car having a flat solid body section of substantially uniform longitudinal cross section extending between the slits, the surface of the body being close to the support means and slightly above the level of the airport surface and adapted for receiving an aircraft landing gear unit, substantially continuous upright members extending downwardly from each side of the body section into said slits, rail wheels rotatably supported by the upright members and an elongated ramp having an edge thereof pivotally secured on an edge portion of the car, the surface of said body section being substantially the highest fixed point on the car.

15. Apparatus for transporting aircraft having spaced landing gear units at airports having a taxiway and an adjoining apron comprising spaced parallel rails disposed in trenches extending into the taxiway and apron, the upper surfaces of the rails being below the taxiway and apron surfaces, fixed cover means extending partially over each of the trenches and being slightly below the level of the adjacent taxiway and apron surfaces, a transfer car having rail wheels for movement along the rails and a body supported on the wheels slightly above the level of said taxiway and apron surfaces for receiving and supporting an aircraft landing gear unit, a rotatable sheave disposed in a pit formed in the apron near the taxiway, a winch drum on the apron beyond the sheave, a cable in one of the trenches trained over the sheave and engaging the drum, means for driving the drum, and a rigid arm in one of the trenches below the cover means secured at one end to said cable and at the opposite end to the transfer car.

16. Apparatus for use with an airport taxiway comprising a pair of spaced parallel rails disposed in trenches extending transversely into the taxiway, the upper surfaces of the rails being disposed below the taxiway surface, rigid cover means comprising metal plates fixed with respect to the taxiway, having their lateral margins extending partially over the trenches near the taxiway surface and defining therewith an elongated continuous slit over each of the trenches, said cover means having its upper surface slightly below the level of the taxiway and being adapted for sustaining aircraft landing gear passing transversely over the trenches, and a transfer car movable along the rails including a body for receiving and supporting aircraft landing gear, and flanged wheels running on said rails and supporting said body slightly above the level of the taxiway.

17. Apparatus for moving an aircraft having landing gear including main and end units at an airport having a taxiway and a parking zone comprising first and second sets of spaced rails, each parallel to the other and at least the first set extending from the parking zone into the taxiway, the distance between said sets of rails being substantially equal to the distance between the main and end landing gear units, the rails of the first set extending into the taxiway being disposed in trenches with the upper portion of each rail below the surface of the taxiway, stationary flat substantially continuous means in the taxiway secured only to the taxiway and projecting over the trenches for supporting aircraft landing gear and defining with the taxiway narrow elongated openings above the level of the rails, an end unit car movable along the second set of rails for receiving the end landing gear unit of an aircraft, a main unit car movable along the first set of rails for receiving the main landing gear unit, the main unit car having a substantially flat unobstructed body extending across the taxiway between the trenches, upright support members extending downwardly from the body through the elongated openings and into said trenches, and rail wheels journaled to the upright support members for movement along the rails, said wheels and support members being disposed and arranged for maintaining said body in a substantially horizontal position slightly above the level of the adjacent taxiway surface, ramp means movably secured along both side edges of the main unit car, means for moving said ramp means between a raised and a lowered position, and power means for moving the main unit car.

18. Apparatus for moving aircraft landing wheels transversely across the ground comprising a pair of spaced parallel rails disposed in trenches which define a central intermediate area slightly depressed from ground level, the rails being wholly below ground level, a landing gear transfer car having flanged rail wheels for movement along the rails and a flat elongated body carried by the wheels, said body continuously spanning said intermediate area and having its upper surface supported slightly above ground level, and power means for moving the car along the rails.

19. Apparatus for moving aircraft landing wheels transversely across the ground comprising a pair of spaced parallel rails disposed in trenches which define a central intermediate area slightly depressed from ground level, the rails being wholly below ground level, a landing gear transfer car having flanged rail wheels for movement along the rails and a flat elongated body carried by the wheels, said body continuously spanning said intermediate area and having its upper surface supported slightly above ground level, a ramp hinged to an edge portion of the car and substantially coextensive therewith, means for raising and lowering the ramp and power means for moving the car along the rails.

20. Apparatus for moving an aircraft having landing gear including a steering nose wheel and spaced fixed main landing wheels at an airport having a taxiway and a parking zone comprising two pairs of spaced rails extending from the parking zone into the taxiway, each pair being parallel to the other and said pairs being spaced apart a distance substantially equal to the distance between the nose wheel and main landing wheels, at least the portion of the rails extending into the taxiway having their upper surfaces supported substantially below the surface of the taxiway, stationary means extending between each pair of rails on the taxiway slightly below the level of the taxiway surface for supporting aircraft landing gear and defining narrow elongated openings over the rails, transfer cars movable along each of said pairs of rails for receiving aircraft landing gear including a main wheel car for receiving one main wheel and a nose wheel car for receiving the nose wheel, each of said cars having a substantially flat body extending across the taxiway above the stationary means, upright support members extending downwardly from the body into the elongated openings, rail wheels journaled to the upright support members for movement along the rails, said wheels and support members being disposed and arranged for maintaining the upper surface of said body slightly above the level of the taxiway surface, and power means for moving only said main wheel car along the rails.

21. Apparatus for moving a load between a raised and lowered position comprising a rotatably supported resilient member coupled near one end to the load, lever means coupled to the resilient member near its other end for moving said member, a toggle for actuating the lever means including a pair of links each having spaced end pivots and a common center pivot pin movable past the center line connecting the end pivots, one of said pivots being fixed and the other being carried by the lever means, a fixed stop member for limiting movement of the center pin past the center line connecting the end pivots when moved in a direction for raising the load, and means for moving the center pin back and forth across said center line.

22. Apparatus for raising and lowering a ramp pivoted to a car movable along a track comprising a rotatably supported torsion bar spring on the car, means secured near one end of the spring for coupling the spring to the ramp, lever means having a fulcrum fixed to the car and secured to the spring near its opposite end for rotating the spring between raised and lowered positions, a rigid member pivotally secured to the car and coupled to the lever means, said member being movable in one direction about its pivot for raising the lever means past a maximum point and in the opposite direction for reversing movement of the lever means, and a fixed stop for limiting movement of the rigid member in said one direction.

23. Apparatus for use with an aircraft transfer car movable along rails between a taxiway and a parking zone for raising and lowering an edge ramp pivotally secured to an edge of the car comprising a lever pivotally secured to the car and coupled to the ramp, a first bell crank having a first arm projecting laterally from the car, and a second arm, locking toggle means coupling the second arm to the lever, said first bell crank being pivotally secured near its midpoint to the car, a fixed support in the taxiway, a second bell crank pivoted to the fixed support and including a laterally projecting arm defining an end notch in the path of the projecting first arm for moving said first arm, and means for actuating the second bell crank.

24. Apparatus for raising and lowering a ramp pivoted near one edge to an edge portion of a transfer car movable along rails between first and second positions, said car having a substantially horizontal body section and depending upright members along the edges of the body, comprising a laterally disposed lever pivoted to the car beneath the body and pivotally coupled near one end to the ramp, a follower wheel on the lever and a track for the follower wheel extending between the first and second positions for moving the wheel and lever only when the car is in the first of said positions, said track being so disposed and arranged with respect to the car as to maintain the said ramp and lever in raised position when the car is in other than said first position.

25. Apparatus for moving aircraft on the ground between first and second positions comprising parallel rails extending between said positions, said rails being disposed in trenches with the upper surface of the rails below ground level, a wheeled transfer car movable along the rails, said car including a body supported substantially at ground level, a ramp along an edge of the car body movable between raised and lowered positions, means for lowering the ramp, said means being operable only when the car is in said first position, and means carried by the car for maintaining said ramp in raised position at all other times.

26. Apparatus for moving aircraft along the ground between first and second positions comprising a center rail, a pair of spaced outer rails parallel to the center rail, all of said rails near the first position being disposed below ground level, cover means resting on the ground between the rails and extending laterally partially over the rails defining elongated slits, a transfer car movable along the rails including a rigid body above the cover means having a longitudinally disposed hinge formed therein approximately above the center rail, and wheels movable along each of the rails and uprights connecting the wheels with the body, the center upright engaging the lower surface of the body near said longitudinally extending hinge, the outer rails being disposed at a predetermined level with respect to the center rail throughout a majority of the distance between the first and second positions for supporting the edges of the body above the level of the hinge, and said outer rails being disposed at a relatively lower level near the said first position for lowering the body edges approximately to the level of the hinge.

References Cited in the file of this patent

UNITED STATES PATENTS

| | | |
|---|---|---|
| 1,454,807 | Wright | May 8, 1923 |
| 1,797,830 | Koehler | Mar. 24, 1931 |
| 1,847,549 | Adams | Mar. 1, 1932 |
| 1,902,205 | Webster | Mar. 21, 1933 |